(12) United States Patent
Comte

(10) Patent No.: US 7,465,686 B2
(45) Date of Patent: Dec. 16, 2008

(54) GLASS-CERAMIC MATERIALS, PRECURSOR GLASS THEREOF AND PROCESS FOR MAKING THE SAME

(75) Inventor: Marie Jacqueline Monique Comte, Fontenay aux Roses (FR)

(73) Assignee: Eurokera (FR)

( * ) Notice: Subject to any disclaimer, the term of this patent is extended or adjusted under 35 U.S.C. 154(b) by 150 days.

(21) Appl. No.: 11/475,273

(22) Filed: Jun. 26, 2006

(65) Prior Publication Data

US 2007/0004578 A1    Jan. 4, 2007

(30) Foreign Application Priority Data

Jun. 30, 2005    (FR)    ................... 05 06684

(51) Int. Cl.
*C03C 10/12*    (2006.01)
*C03C 10/14*    (2006.01)

(52) U.S. Cl. ............... 501/4; 501/7; 65/33.1; 65/33.8

(58) Field of Classification Search ........ 501/4, 501/7; 65/33.1, 33.8
See application file for complete search history.

(56) References Cited

U.S. PATENT DOCUMENTS

| | | | | |
|---|---|---|---|---|
| 4,438,210 A | * | 3/1984 | Rittler | 501/4 |
| 4,455,160 A | * | 6/1984 | Rittler | 65/30.13 |
| 4,755,488 A | | 7/1988 | Nagashima | 501/4 |
| 4,786,619 A | | 11/1988 | Gerrard et al. | 501/64 |
| 4,919,697 A | | 4/1990 | Pecoraro et al. | 65/134 |
| 5,070,045 A | | 12/1991 | Comte et al. | 501/4 |
| 6,673,729 B2 | * | 1/2004 | Siebers et al. | 501/4 |
| 6,930,289 B2 | | 8/2005 | Siebers et al. | 3/68 |
| 7,091,141 B2 | * | 8/2006 | Horsfall et al. | 501/4 |
| 7,153,795 B2 | * | 12/2006 | Comte et al. | 501/4 |
| 7,199,066 B2 | * | 4/2007 | Horsfall et al. | 501/67 |
| 7,285,506 B2 | * | 10/2007 | Horsfall et al. | 501/7 |

FOREIGN PATENT DOCUMENTS

| | | |
|---|---|---|
| CA | 2 299 202 | 8/2000 |
| DE | 199 39 787 | 2/2001 |
| EP | A0437228 | 1/1991 |
| EP | 1 029 830 | 8/2000 |
| EP | A1398303 | 9/2003 |
| FR | 2 864 071 | 6/2005 |
| JP | 11100229 | 4/1999 |
| JP | 11100230 | 4/1999 |
| WO | WO 02/16279 | 2/2002 |

OTHER PUBLICATIONS

English language abstract for DE 199 39 787, supplied from esp@cenet database.

* cited by examiner

*Primary Examiner*—Karl E Group
(74) *Attorney, Agent, or Firm*—Siwen Chen; Steven J. Scott; Michael W. Russell

(57) ABSTRACT

The invention relates to: a method of preparing glass-ceramics of β-quartz and/or of β-spodumene; a method of preparing articles made from said glass-ceramics; novel glass-ceramics of β-quartz and/or of β-spodumene; articles made from said novel glass-ceramics; and lithium aluminosilicate glasses, which are precursors of such novel glass-ceramics. The present invention relates to the use, as agent for fining the glass-ceramic glass precursor, of fluorine and at least one oxide of a multivalent element.

10 Claims, No Drawings

GLASS-CERAMIC MATERIALS, PRECURSOR GLASS THEREOF AND PROCESS FOR MAKING THE SAME

FIELD OF THE INVENTION

The present invention relates to: a method of preparing glass-ceramics containing a solid solution of β-quartz or of β-spodumene (solid solutions of β-quartz and β-spodumene), as main crystalline phase(s); a method of preparing articles made from said glass-ceramics; novel glass-ceramics containing a solid solution of β-quartz or of β-spodumene (solid solutions of β-quartz and β-spodumene), as main crystalline phase(s); articles made from said novel glass-ceramics; and lithium aluminosilicate glasses, which are precursors of said novel glass-ceramics.

The present invention relates to the incorporation, within the compositions of said glass-ceramics and glasses, of original compounds so as to ensure the function of agent for fining the glass.

BACKGROUND OF THE INVENTION

The glass-ceramics which contain a solid solution of β-quartz or of β-spodumene (solid solutions of β-quartz and β-spodumene), as main crystalline phase(s) are materials which are known per se, and which are obtained by heat treatment of glasses or inorganic fillers. These materials are used in various contexts and notably as a substrate for cooktops and as fire-windows.

Transparent, opalescent, or even opaque glass-ceramics are known of various colors.

The preparation of articles made from a glass-ceramic of β-quartz and/or β-spodumene classically comprise three main successive steps:
  a first step of melting an inorganic glass or a filler, which is a precursor of such a glass, which is generally carried out between 1,550 and 1,650° C.,
  a second step of cooling and shaping the molten glass obtained, and
  a third step of crystallization or ceramming of the cooled, shaped glass, by an appropriate heat treatment.

Upon completion of the first step of melting, it is important to remove gaseous inclusions as efficiently as possible from the molten glass mass. To this end, at least one fining agent is incorporated within it.

Arsenic oxide ($As_2O_3$) is generally used in the methods used hitherto, typically at more than 0.1% by weight and at less than 1% by weight. Antimony oxide ($Sb_2O_3$) is also used at higher contents.

In view of the toxicity of these products and of the most drastic rules in force (with reference to the safety and the protection of the environment), the incorporation of these products is sought to be minimized, even avoided, and other compounds are sought which are less toxic, even non-toxic and which are effective as fining agents.

Furthermore, for obvious reasons of economy, it is not desired to modify the operating conditions of the industrial method made use of at present. Notably, it is not desired to operate at higher temperature, which would imply spending more energy and would worsen the problems of corrosion.

Compounds other than arsenic oxide and antimony oxide are thus sought after which are effective under the same operating conditions as fining agents (compounds substituting, at least partially, advantageously totally, for said oxides) of the glass which is to be cerammed.

In addition to its role as fining agent, the arsenic oxide can be incorporated to confer a dark color to the glass-ceramic which contains it. To this end, it reacts with the vanadium present; it reduces said vanadium during the ceramming. In the precursor glass, the vanadium which is present—it is in general added at the rate of about 0.2% by weight—is so mainly in the oxidized state. However, during the ceramming, the reaction between the arsenic and the vanadium is never complete. The reaction has a tendency to continue when the glass-ceramic is heated further. Thus, a decrease is observed of the transmission in the visible and the infra-red when the glass-ceramic undergoes a treatment, known as <<aging>>, of 100 hours at 700° C. In view of the foregoing, it is strongly desired that the compounds substituting for arsenic oxide, which are proposed as agents for fining the glass, do not disrupt obtaining, after ceramming, the dark color, when it is desired, and it would be moreover advantageous that they ensure a better stability of said dark color with ageing.

According to prior art, it has been proposed to use, as agent for fining glasses, precursors of glass-ceramics (containing a solid solution of β-quartz or of β-spodumene (solid solutions of β-quartz and β-spodumene), as main crystalline phase(s)), tin oxide ($SnO_2$).

Patent Applications JP 11 100 229 and 11 100 230 thus describe the use of tin oxide ($SnO_2$), alone or in combination with chlorine (Cl), at the rate of:
  $SnO_2$: 0.1-2% by weight
  Cl: 0-1% by weight.

Applications DE 19 939 787.2 and WO 02/16279 mention the use of tin oxide ($SnO_2$), cerium oxide ($CeO_2$), and sulfate or chlorine-containing compounds. These documents more particularly illustrate the use of tin oxide which is incorporated at less than 1% by weight. No specification on the fining performance obtained is found in said documents.

The inventor, faced with this technical problem of providing fining agents which substitute, at least partially, for $As_2O_3$ and/or $Sb_2O_3$, has studied the performances of $SnO_2$ and has shown that this compound is not fully satisfactory alone.

The effectiveness of $SnO_2$, as agent fining glasses precursors of glass-ceramics, increases with the amount of said $SnO_2$ incorporated. It is thus possible to obtain good results with regard to the fining of said glasses, which good results are almost comparable to those obtained hitherto notably with $As_2O_3$, by using adequate amounts of $SnO_2$. The incorporation of these adequate amounts, which are effective from a fining point of view, is, however, detrimental:
  firstly, due to the low solubility of $SnO_2$ in the glass. Problems of devitrification and difficulties of implementation of the melting are observed very quickly, and
  secondly, due to the reducing power of $SnO_2$. $SnO_2$ can reduce transition metal oxides which are present in the glass, notably vanadium oxide which is commonly used to produce dark glass-ceramics and therefore to strongly influence the color of the ceramic sought after. In its presence, in the amounts which are effective for the fining of the precursor glass, the color of the final glass-ceramic is difficult to control.

It is thus hardly sufficient to propose using $SnO_2$ as effective fining agent instead of the conventional fining agents ($As_2O_3$ and/or $Sb_2O_3$).

The inventor, with reference to the technical problem, has tested the joint use of $SnO_2$ and Cl. The results obtained are much less interesting than those obtained with the means of the invention which are described below (vide Table 1, infra).

According to prior art, the joint incorporation has been described of fluorine and an oxide of a multivalent element (an element which can exist in various valencies) in compositions of glass or glass-ceramics. Such an incorporation has not, to the knowledge of the inventor, been described with reference to the problem of fining glasses, which are precursors of glass-ceramics of β-quartz and/or β-spodumene.

Thus, U.S. Pat. No. 6,673,729 describes glass-ceramics of β-quartz and/or of keatite, which can contain fluorine (from 0 to 0.6% by weight) and at least one agent for fining the glass (generally from 0.5 to 2% by weight), which is notably selected from $As_2O_3$, $Sb_2O_3$, $SnO_2$, $CeO_2$ . . . Only the use of $As_2O_3$ and $Sb_2O_3$ is illustrated in the Examples. The compositions indicated for these glass-ceramics, which are intended to constitute substrates, which are used for example for preparing reflectors, are strict (note may be made in particular of: $Na_2O+K_2O$: 0.5 to 3% by weight, $MgO+ZnO<0.3%$ by weight and $Fe_2O_3<0.02%$ by weight). Said glass-ceramics have a strong transmission in the near infra-red and, at the surface, a layer which is glassy and has a certain roughness. The presence of fluorine reveals to be advantageous for decreasing the viscosity, at high temperature, of the precursor glasses and eventually for increasing the mechanical strength of the glass-ceramics.

It is to the merit of the inventor to have demonstrated, in such a context, the interest of a "fluorine+at least one oxide of a multivalent element (at least one oxide of an element which can exist in various valences)" combination, to have observed surprisingly that such a "fluorine+at least one oxide of a multivalent element" combination is effective as a fining agent, the $SnO_2$ being incorporated, when it does, at a low content in said combination, such that the problems set forth above are minimized, even avoided. It is also to the merit of the inventor to have observed that such a combination, which is effective as a fining agent, is also effective with reference to the technical problem of the stability of the color.

SUMMARY OF THE INVENTION

According to a first object, the present invention relates to a method of preparing a glass-ceramic containing a solid solution of β-quartz or of β-spodumene (solid solutions of β-quartz and β-spodumene), as main crystalline phase(s), a method which comprises heat-treating a lithium aluminosilicate glass, which is a precursor of such a glass-ceramic, under conditions which ensure its ceramming.

Characteristically, within the context of the implementation of said method, the treated glass contains fluorine and at least one oxide of a multivalent element which is different from arsenic oxide and antimony oxide, as fining agent.

According to a second object, the present invention relates to a method of preparing an article made from a glass-ceramic containing a solid solution of β-quartz or of β-spodumene (solid solutions of β-quartz and β-spodumene), as main crystalline phase(s), which method comprises:

melting a lithium aluminosilicate glass or a filler, which is a precursor of such a glass; said glass or said filler containing an effective and non-excess amount of at least one fining agent; followed by fining the molten glass obtained;

cooling the molten fined glass obtained, and, simultaneously, shaping it into the shape desired for the article sought after; and ceramming said shaped glass.

Characteristically, within the context of carrying out said method, the glass or the precursor filler contains, as fining agent, fluorine and at least one oxide of a multivalent element which is different from arsenic oxide and from antimony oxide.

According to a third object, the present invention relates to novel glass-ceramics containing a solid solution of β-quartz or of β-spodumene (solid solutions of β-quartz and β-spodumene), as main crystalline phase(s), which can be obtained by said methods of the invention above.

According to a fourth object, the present invention relates to articles made from such a novel glass-ceramic, which glass-ceramic jointly contains fluorine and at least one oxide of a multivalent element in its composition.

According to a fifth object, the present invention relates to lithium aluminosilicate glasses, which are precursors of glass-ceramics of the invention.

DETAILED DESCRIPTION OF THE INVENTION

Within the context of carrying out the two above methods of the invention (methods which are known per se), fluorine (F) and at least one oxide of a multivalent element, which is different from arsenic oxide ($As_2O_3$) and antimony oxide ($Sb_2O_3$), is incorporated, in an original and characteristic way, as fining agent of the precursor glass.

According to these two first objects, the present invention relates in other terms to the joint use of fluorine and at least one oxide of a multivalent element, which is different from arsenic oxide and antimony oxide, as agent for fining a precursor glass of a glass-ceramic or of an article made from a glass-ceramic (a glass-ceramic of β-quartz or and/or β-spodumene).

The "fluorine+at least one oxide of a multivalent element" combination, the performances of which as fining agent were demonstrated within the context of the invention, can be incorporated in total or partial substitution for other fining agents, notably conventional fining agents $As_2O_3$ and/or $Sb_2O_3$.

It is therefore not excluded that the precursor glasses or fillers, which are used in the methods of the invention, contain other fining agents, in addition to said combination, (other than $As_2O_3$ and/or $Sb_2O_3$ or $As_2O_3$ and/or $Sb_2O_3$, in an amount which is less than according to prior art). However, preferably, said precursor glasses or fillers contain, with the exception of inevitable traces, neither arsenic, nor antimony. Particularly preferably, said precursor glasses or fillers contain, with the exception of inevitable traces, neither arsenic, nor antimony, nor other fining agent.

The effectiveness of said "fluorine+at least one oxide of a multivalent element" combination as fining agent, are unexpected.

Generally:

the person skilled in the art has known for a long time about the use of multivalent compounds as fining agent. At high temperature, their reduced form is promoted and their reduction implies a release of oxygen which promotes the fining. However, for glass meltings which are carried out at high temperature (>1,550° C.), the arsenic is known to be much more efficient than other multivalent elements . . .

the person skilled in the art knows about the influence of the fluorine on the viscosity (vide notably the teaching of U.S. Pat. No. 6,673,729 recalled supra). It is nevertheless known that said fluorine has never, per se, constituted an effective fining agent and that its presence, in a large amount, can be prejudicial to the transparency of the final product.

It would seem that said fluorine accentuates (maximizes) the action of said at least one oxide of a multivalent element, within the "fluorine+at least one oxide of a multivalent element" combination.

Furthermore, said fluorine has not got a significant effect upon the reduction of vanadium oxide, and so no significant effect upon the coloration by said vanadium oxide. In this, this is also an interesting partner in fining of said at least one oxide of a multivalent element, which is all the more interesting since the resistance of the color to aging is also improved.

It has already been understood that within the context of carrying out the methods of the invention, the "fluorine+at least one oxide of a multivalent element" combination contains one or more of said oxides (in a mixture). Advantageously, the combination contains only one such oxide.

Said "fluorine+at least one oxide of a multivalent element" combination, the use of which as an agent for fining the glass is recommended according to the invention within the context of the preparation of glass-ceramics and of articles made from glass-ceramics, is advantageously of "fluorine+at least one oxide of a multivalent element selected from $SnO_2$, $V_2O_5$, $CeO_2$, $MnO_2$ et $Fe_2O_3$ (therefore taken alone or in combination)" type.

The methods of the invention can be carried out with any oxide of a multivalent element (which can therefore be reduced with release of oxygen), and notably with those listed above. The person skilled in the art nevertheless understands that in certain contexts, some of said oxides must be set aside for reasons of coloration of the final glass-ceramic. The oxides of cerium, of manganese and of iron can give rise to this type of problem.

Within the context of the methods of the invention, it is more particularly recommended to use tin oxide ($SnO_2$) and/or vanadium oxide ($V_2O_5$) as oxide of a multivalent element.

With reference to the use of tin oxide, it is recalled here what has been described in the introduction of the present text. The use of said tin oxide in significant amounts is detrimental. It is recommended to not use it at more than 0.7% by weight, advantageously at an amount of less than or equal to 0.5% by weight.

In general, within the context of carrying out the methods of the invention, it is recommended:
- to add the fluorine in an amount of between 0.1 and 2% by weight (a part of said fluorine added evaporates during the melting and the fining, and the final glass-ceramic contains less of it);
- to add said at least one oxide of a multivalent element in an amount of between 0.2% and 2% by weight; $SnO_2$ is being incorporated at no more than 0.7% by weight, advantageously being incorporated at no more than 0.5% by weight.

The person skilled in the art can optimize the joint use of said fluorine and at least one oxide of a multivalent element within a context of fining glasses, which are precursors of glass-ceramics of β-quartz and/or β-spodumene. Such a use, within the context of carrying out the methods of the invention described above, can, from novel or non-novel glasses, lead to glass-ceramics which are novel, or not.

The methods of the invention, as described above, are advantageously carried out for the preparation of glass-ceramics, the compositions of which by weight are specified below.

According to its third object, the present invention relates to novel glass-ceramics containing a solid solution of β-quartz or of β-spodumene (solid solutions of β-quartz and β-spodumene), as main crystalline phase(s), which can be obtained by said methods of the invention above.

Said novel glass-ceramics have a composition expressed as percentages by weight of oxides and of fluorine, which essentially consists of:

| | |
|---|---|
| $SiO_2$ | 60-72 |
| $Al_2O_3$ | 18-23 |
| $LiO_2$ | 2.5-4 |
| MgO | 0.5-2 |
| ZnO | 1-3 |
| $TiO_2$ | 1.5-3.5 |
| $ZrO_2$ | 0-2.5 |
| BaO | 0-2 |
| SrO | 0-2 |
| CaO | 0-2 |
| $Na_2O$ | 0-1.5 |
| $K_2O$ | 0-1.5 |
| $P_2O_5$ | 0-5 |
| $B_2O_3$ | 0-3 |
| F | 0.05-1, advantageously 0.05-0.3; | and at least one oxide of a multivalent element, said oxide or the sum of said oxides, which are thus each present at the rate of at least 0.15%, representing between 0.2 and 2%; $SnO_2$, if it is incorporated, being present at the most only at the rate of 0.7%.

Indication is given that the compositions in question "essentially consist of" the list given of the oxides and of fluorine. This signifies that within said compositions, the sum of the oxides and of the fluorine which are listed represents at least 95%, generally at least 98% by weight. It is not in fact excluded to find, in low amounts, other compounds within said compositions such as lanthanum, yttrium, colorants (vide infra).

Novel glass-ceramics of the invention have advantageously the composition given above, with: BaO 0-1; SrO 0-1; CaO 0-1; $Na_2O$ 0; $K_2O$ 0.

In the Application EP-A-0 437 228, the Applicant describes glass-ceramics, having interesting properties, which notably can be cerammed rapidly. Such glass-ceramics are advantageously concerned by the present invention. Thus, glass-ceramics also make up a part of the third object of the invention, glass-ceramics, the composition of which expressed as percentages by weight of oxides and fluorine, essentially consists of:

| | |
|---|---|
| $SiO_2$ | 65-70 |
| $Al_2O_3$ | 18-19.8 |
| $Li_2O$ | 2.5-3.8 |
| MgO | 0.55-1.5 |
| ZnO | 1.2-2.8 |
| $TiO_2$ | 1.8-3.2 |
| BaO | 0-1.4 |
| SrO | 0-1.4 |
| with BaO + SrO | 0.4-1.4 |
| with MgO + BaO + SrO | 1.1-2.3 |
| $ZrO_2$ | 1.0-2.5 |
| $Na_2O$ | 0-<1.0 |
| $K_2O$ | 0-<1.0 |
| with $Na_2O + K_2O$ | 0-<1.0 |
| with $2.8Li_2O + 1.2ZnO/5.2MgO$ | >1.8 |
| F | 0.05-1, advantageously 0.05-0.3; | and at least one oxide of a multivalent element, said oxide or the sum of said oxides, which are thus each present at the rate of at least 0.15%, representing between 0.2 and 2%; $SnO_2$, if it is incorporated, being present at the most only at the rate of 0.7%.

In the Application EP-A-1 398 303, the Applicant describes glass-ceramics of the same type, which are improved with reference to the problem of devitrification. Such glass-ceramics are also concerned by the present invention. Thus, glass-ceramics also make up a part of the third object of the present invention, glass-ceramics, the composition of which, expressed as percentages by weight of oxides and fluorine, essentially consists of:

| | |
|---|---|
| $SiO_2$ | 65-70 |
| $Al_2O_3$ | 18-20.5 |
| $Li_2O$ | 2.5-3.8 |
| MgO | 0.55-1.5 |
| ZnO | 1.2-2.8 |
| BaO | 0-1.4 |
| SrO | 0-1.4 |
| with BaO + SrO | 0.4-1.4 |
| with MgO + BaO + SrO | 1.1-2.3 |
| $Na_2O$ | 0-<1 |
| $K_2O$ | 0-<1 |
| with $Na_2O + K_2O$ | 0-<1 |
| with $(2.8\ Li_2O + 1.2\ ZnO)/5.2\ MgO$ | >1.8 |
| $TiO_2$ | 1.8-3.5 |
| $ZrO_2$ | 0.8-1.6 |
| with $\dfrac{TiO_2}{ZrO_2}$ | >2.2 |
| F | 0.05-1, advantageously 0.05-0.3; | and at least one oxide of a multivalent element, said oxide or the sum of said oxides, which are thus each present at the rate of at least 0.15%, representing between 0.2 and 2%; $SnO_2$, if it is incorporated, being present at the most only at the rate of 0.7%.

Within the compositions given above, the oxides of a multivalent element in question are advantageously selected from $SnO_2$, $V_2O_5$, $CeO_2$, $MnO_2$ and $Fe_2O_3$. Said oxides are incorporated, independently on in combination, in the amounts indicated above and preferably in the amounts below:

| | |
|---|---|
| $SnO_2$ | 0-0.7, advantageously 0-0.5 |
| $CeO_2$ | 0-2 |
| $MnO_2$ | 0-2 |
| $Fe_2O_3$ | 0-2 |
| $V_2O_5$ | 0-1 (the amount of $V_2O_5$ is advantageously limited insofar as this element can generate a very dark color). |

The novel glass-ceramics of the invention advantageously contain fluorine (between 0.05 and 1% by weight, advantageously between 0.05 and 0.3% by weight: it is recalled here incidentally that a part of the fluorine added is volatilized) and at least one oxide of a multivalent element, advantageously selected from $SnO_2$, $CeO_2$, $MnO_2$, $Fe_2O_3$, $V_2O_5$ (between 0.2 and 2% by weight). These two types of compounds have developed a synergy during the fining of the precursor glasses.

As set forth above, the glass-ceramics of the invention can contain colorants. Their composition can therefore contain an effective amount (with reference to the effect of coloration sought after) of at least one colorant. Said at least one colorant is advantageously selected from CoO, $Cr_2O_3$, $Fe_2O_3$, $MnO_2$, NiO, $V_2O_5$ and $CeO_2$ (thus taken alone or in combination). It has been seen above that $V_2O_5$ is commonly used to obtain dark glass-ceramics. It has been seen above that the fining according to the invention is particularly effective in that it reinforces the resistance of the coloration to aging.

The glass-ceramics of the invention advantageously contain, with the exception of inevitable traces, neither arsenic, nor antimony, nor other fining agent. The fining of their precursor glass was implemented without arsenic oxide and/or antimony oxide, with the "fluorine+at least one oxide of a multivalent element" combination as fining agent.

According to its fourth object, the present invention relates to articles made from a glass-ceramic, as described above, which glass-ceramic jointly contains fluorine and at least one oxide of a multivalent element in its composition. Said articles can notably consist of cook-tops, cooking utensils, microwave oven plates, fireplace windows, fire-doors, fire-windows, pyrolysis- or catalysis-oven windows. Such a list is not exhaustive.

According to its fifth object, the present invention relates to lithium aluminosilicate glasses, which are precursors of glass-ceramics of the invention, as described above. Said glasses have a composition which corresponds to those specified above for the glass-ceramics of the invention.

Advantageously, said novel glasses have a composition which contains, with the exception of inevitable traces, neither arsenic, nor antimony. Very advantageously, said novel glasses contain, as fining agent, only the "F+at least one oxide of a multivalent element" combination in the sense of the invention.

EXAMPLES

The present invention is illustrated by the following Examples.

I. Fining of the Glass

Glasses were prepared in the usual way from oxides and/or from compounds which can be easily decomposed such as nitrates or carbonates. The starting materials are mixed to obtain a homogeneous mixture.

The compositions placed in the oven are indicated in Table 1 below.

About 800 g of starting materials were placed in silica crucibles. The crucibles were then introduced into an oven pre-heated to 1,400° C. They undergo therein the following melting cycle:

160 minutes of 1,400 to 1,600° C.,
100 minutes of 1,600 to 1,650° C., and
110 minutes at 1,650° C.

The glasses corresponding to compositions A to D and 1 to 3 were then rolled to a thickness of 6 mm and re-heated for 1 hour at 650° C. The number of seeds was counted automatically by a camera coupled to an image analyzer. The result of the counting is indicated in Table 1 below.

At the completion of the plateau at 1,650° C., the glasses having the compositions E, 4 and 5 underwent, in their crucible, a cooling of one hour between 1,650 and 1,450° C. The crucibles were then taken out of the oven and the glasses were re-heated in their crucibles. The number of seeds was counted by a camera coupled to an image analyzer, on two diameters 32 and 3 mm thick taken at 10 and 30 mm under the surface of the glass, respectively. The number of seeds indicated in Table 1 below is the average of the two values obtained.

As indicated in Table 1 below are compositions placed in the oven:

composition A contains, as fining agent, 0.6% by weight of arsenic oxide ($As_2O_3$) and, as colorant, 0.2% by weight of $V_2O_5$,
composition B contains 0.2% by weight of $SnO_2$,
composition C contains 0.5% by weight of $V_2O_5$, composition D contains 0.2% by weight of F,
composition E contains 0.4% by weight of Cl and 0.2% by weight of $SnO_2$,
composition 1 contains 0.2% by weight of F and 0.2% by weight of $SnO_2$,
composition 2 contains 0.2% by weight of F and 0.5% by weight of $V_2O_5$,
composition 3 contains 0.2% by weight of F and 1% by weight of $MnO_2$,
compositions 4 and 5 contain 0.2% by weight of F and 0.2% by weight of $SnO_2$.
F is introduced in the form of $MgF_2$.
Compositions 1 to 5 illustrate the invention.

The tests clearly demonstrate that $SnO_2$, $V_2O_5$, and F, alone, as well as $SnO_2$ with Cl (in the amounts indicated) are indeed less effective as an agent for fining the glass than $As_2O_3$, used in the amount indicated. However, surprisingly, the combinations $SnO_2$+F, $V_2O_5$+F and $MnO_2$+F give satisfactory results. The combinations $SnO_2$+F give very interesting results. Said combinations $SnO_2$+F are particularly effective.

As indicated above, the influence of the fluorine in the fining of the glass is not explained. It may certainly be possible to explain said influence, at least partially, by a lowering of the viscosity but it does appear than this explanation is not totally satisfactory insofar as the fluorine alone is not an effective fining agent.

II. Fining of the Glass and Ceramming

It is demonstrated below that the fining according to the invention does not significantly modify the properties (thermal expansion, color and transmission) of the glass-ceramics prepared and that on the contrary, a positive effect is observed on the aging.

Glasses (prior art and invention) were prepared, they were cerammed and the properties of the ceramics obtained were measured (upon completion of the ceramming and after aging).

The starting materials were heated to 1,500° C. and the melting was then implemented at 1,650° C. for 6 hours. The glass was rolled to a thickness of 6 mm and re-heated for 1 hour at 650° C.

The glass pieces were cerammed in a static oven according to the following heating program:
20 minutes from ambient temperature to 600° C.,
45 minutes from 600 to 820° C.,
20 minutes from 820 to 930° C., and
15 minutes at 930° C.

Upon completion of the ceramming, the coefficient of thermal expansion, the integrated transmission Y and the transmission at 1,050 nm, were measured. The transmissions were measured on a sample of 3 mm thickness. Y was measured in using the illuminant D65/observer at 2°.

The aging was implemented for 100 hours at 700° C. in a static oven. After said aging, the coefficient of thermal expansion, the integrated transmission Y and the transmission at 1,050 nm, were measured again.

TABLE 1

| | Examples | | | | | | | | | |
|---|---|---|---|---|---|---|---|---|---|---|
| | A | B | C | D | E | 1 | 2 | 3 | 4 | 5 |
| $SiO_2$ | 68.50 | 69.03 | 68.80 | 69.10 | 68.63 | 68.83 | 68.60 | 68.10 | 68.83 | 68.13 |
| $Al_2O_3$ | 19.3 | 19.3 | 19.3 | 19.3 | 19.3 | 19.3 | 19.3 | 19.3 | 19.3 | 19.8 |
| $LiO_2$ | 3.5 | 3.5 | 3.5 | 3.5 | 3.5 | 3.5 | 3.5 | 3.5 | 3.5 | 4.1 |
| MgO | 1.1 | 1.1 | 1.1 | 1.1 | 1.1 | 1.1 | 1.1 | 1.1 | 1.1 | 1 |
| ZnO | 1.6 | 1.6 | 1.6 | 1.6 | 1.6 | 1.6 | 1.6 | 1.6 | 1.6 | 1.6 |
| $TiO_2$ | 2.6 | 2.6 | 2.6 | 2.6 | 2.6 | 2.6 | 2.6 | 2.6 | 2.6 | 2.6 |
| $ZrO_2$ | 1.8 | 1.8 | 1.8 | 1.8 | 1.8 | 1.8 | 1.8 | 1.8 | 1.8 | 1.7 |
| BaO | 0.8 | 0.8 | 0.8 | 0.8 | 0.8 | 0.8 | 0.8 | 0.8 | 0.8 | |
| $K_2O$ | | | | | | | | | | 0.6 |
| $SnO_2$ | | 0.2 | | | 0.2 | 0.2 | | | 0.2 | 0.2 |
| $MnO_2$ | | | | | | | | 1 | | |
| F | | | | 0.2 | | 0.2 | 0.2 | 0.2 | 0.2 | 0.2 |
| Cl | | | | | 0.4 | | | | | |
| $As_2O_3$ | 0.6 | | | | | | | | | |
| $V_2O_5$ | 0.20 | 0.07 | 0.5 | | 0.07 | 0.07 | 0.5 | | 0.07 | 0.07 |
| Number of seeds/cm³ | 110 | 720 | 990 | 880 | 300 | 20 | 150 | 150 | 20 | 15 |

The compositions of the glasses and glass-ceramics, as well as the properties of said glass-ceramics, are given in Table 2 below.

TABLE 2

| | Example 1 | Example 2 | Example 3 |
|---|---|---|---|
| Composition (% by weight) | | | |
| $SiO_2$ | 69.00 | 69.20 | 68.86 |
| $Al_2O_3$ | 18.9 | 19 | 19.3 |
| $Li_2O$ | 3.4 | 3.4 | 3.5 |
| MgO | 1.2 | 1.1 | 1.1 |
| ZnO | 1.6 | 1.6 | 1.6 |
| BaO | 0.8 | 0.8 | 0.8 |
| $TiO_2$ | 2.6 | 2.6 | 2.7 |
| $ZrO_2$ | 1.7 | 1.7 | 1.8 |
| $As_2O_3$ | 0.6 | | |
| $SnO_2$ | | | 0.20 |
| $V_2O_5$ | 0.20 | 0.50 | 0.04 |
| F | | 0.1 | 0.1 |
| (F placed in the oven | | 0.2 | 0.2) |
| After ceramming | | | |
| CTE (25-700° C.) ($\times 10^{-7} K^{-1}$) | −1 | −1.8 | −1.1 |
| Y | 3 | 4.2 | 4.2 |
| T @ 1,050 nm | 65% | 72% | 79% |
| After ceramming and aging | | | |
| CTE (25-700° C.) | | $-1.9 \times 10^{-7} K^{-1}$ | $-1.7 \times 10^{-7} K^{-1}$ |
| Y | 0.7 | 3.4 | 2.4 |
| T @ 1,050 nm | 55% | 72% | 77% |

The sample of Example 1 (from prior art) contains arsenic oxide, whilst those of Examples 2 and 3 (of the invention) contain $V_2O_5+F$ and $SnO_2+F$, respectively, as fining agent.

After aging, the parameters—integrated transmission Y and transmission at 1,050 nm—have decreased significantly for Example 1. For Examples 2 and 3, the observed decrease is less. With respect to this, Example 2 appears to be particularly interesting: the absence of an element which can reduce the vanadium (such as arsenic or tin) strongly limits the loss in transmission in the visible during aging.

What is claimed is:

1. A glass-ceramic containing a solid solution of β-quartz or of β-spodumene or solid solutions of β-quartz and β-spodumene, as main crystalline phase(s), the composition of which, expressed as percentages by weight of oxides, essentially consists of:

| | |
|---|---|
| $SiO_2$ | 60-72 |
| $Al_2O_3$ | 18-23 |
| $Li_2O$ | 2.5-4 |
| MgO | 0.5-2 |
| ZnO | 1-3 |
| $TiO_2$ | 1.5-3.5 |
| $ZrO_2$ | 0-2.5 |
| BaO | <2 |
| SrO | 0-2 |
| CaO | 0-2 |
| $Na_2O$ | 0-1.5 |
| $K_2O$ | 0-1.5 |
| $P_2O_5$ | 0-5 |
| $B_2O_3$ | 0-3 |
| F | 0.05-1, advantageously 0.05-0.3; | and at least one oxide of a multivalent element selected from the group consisting of $SnO_2$, $V_2O_5$, $CeO_2$, $MnO_2$ and $Fe_2O_3$, wherein each respective one of said at least one multivalent element oxide comprises at least 0.15% of the glass-ceramic, such that the sum of said multivalent element oxide(s) comprises 0.2-2% of the glass ceramic, wherein $SnO_2$, if included, comprises 0.15-0.7% of the glass-ceramic, and barium oxide is present in an amount up to 2%.

2. The glass-ceramic according to claim 1, the composition of which contains one or more of the following oxides such that, if included, the oxide is present in the following amounts:

| | |
|---|---|
| $SnO_2$ | 0.2-0.7 |
| $CeO_2$ | 0.2-2 |
| $MnO_2$ | 0.2-2 |
| $Fe_2O_3$ | 0.2-2 |
| $V_2O_5$ | 0.2-1. |

3. The glass-ceramic according to claim 1, the composition of which further contains an effective amount of at least one colorant, selected from the group consisting of CoO, $Cr_2O_3$, $Fe_2O_3$, $MnO_2$, NiO, $V_2O_5$, and $CeO_2$.

4. The glass-ceramic according to claim 1, the composition of which contains, with the exception of inevitable traces, neither arsenic, nor antimony.

5. An article made from a glass-ceramic according to claim 1, said article selected from the group consisting of a cooktop, a cooking utensil, a microwave oven plate, a fireplace window, a fire-door or fire-window, and a pyrolysis- or catalysis-oven window.

6. A method of preparing a glass-ceramic containing a solid solution of β-quartz or of β-spodumene or solid solutions of β-quartz and β-spodumene, as main crystalline phase(s) as set forth in claim 1, comprising heat-treating a lithium aluminosilicate glass, which is a precursor of said glass-ceramic, under conditions which ensure its ceramming, wherein said glass jointly contains, as fining agent, fluorine and at least one oxide of a multivalent element which is different from arsenic oxide and from antimony oxide.

7. A method of preparing an article made from a glass-ceramic containing a solid solution of β-quartz or of β-spodumene or solid solutions of β-quartz and β-spodumene, as main crystalline phase(s) as set forth in claim 1, said method comprising:

melting a lithium aluminosilicate glass or a filler, which is a precursor of said glass ceramic; said glass or said filler containing an effective and non-excess amount of at least one fining agent; followed by fining the molten glass obtained;

cooling the molten fined glass obtained, and, simultaneously, shaping it into the shape desired for the article sought after; and ceramming said shaped glass;

wherein said glass or said filler contains, as fining agent, fluorine and at least one oxide of a multivalent element which is different from arsenic oxide and from antimony oxide.

8. The method according to claim 6, wherein said glass or said filler contains, with the exception of inevitable traces, neither arsenic, nor antimony.

9. A glass-ceramic containing a solid solution of β-quartz or of β-spodumene or solid solutions of β-quartz and β-spodumene, as main crystalline phase(s), the composition of which, expressed as percentages by weight of oxides, essentially consists of:

| | |
|---|---|
| $SiO_2$ | 65-70 |
| $Al_2O_3$ | 18-19.8 |
| $Li_2O$ | 2.5-3.8 |
| MgO | 0.55-1.5 |
| ZnO | 1.2-2.8 |
| $TiO_2$ | 1.8-3.2 |
| BaO | 0-1.4 |
| SrO | 0-1.4 |
| with BaO + SrO | 0.4-1.4 |
| with MgO + BaO + SrO | 1.1-2.3 |
| $ZrO_2$ | 1.0-2.5 |
| $Na_2O$ | 0-<1.0 |
| $K_2O$ | 0-<1.0 |
| with $Na_2O + K_2O$ | 0-<1.0 |
| with $2.8Li_2O + 1.2ZnO/5.2MgO$ | >1.8 |
| F | 0.05-1, advantageously 0.05-0.3; | and at least one oxide of a multivalent element selected from the group consisting of $SnO_2$, $V_2O_5$, $CeO_2$, $MnO_2$ and $Fe_2O_3$, wherein each respective one of said at least one multivalent element oxide comprises at least 0.15% of the glass-ceramic, such that the sum of said multivalent element oxide(s) comprises 0.2-2% of the glass ceramic, and $SnO_2$, if included, comprises 0.15-0.7% of the glass-ceramic.

10. A glass-ceramic containing a solid solution of β-quartz or of β-spodumene or solid solutions of β-quartz and β-spodumene, as main crystalline phase(s), the composition of which, expressed as percentages by weight of oxides, essentially consists of:

| | |
|---|---|
| SiO$_2$ | 65-70 |
| Al$_2$O$_3$ | 18-20.5 |
| Li$_2$O | 2.5-3.8 |
| MgO | 0.55-1.5 |
| ZnO | 1.2-2.8 |
| BaO | 0-1.4 |
| SrO | 0-1.4 |
| with BaO + SrO | 0.4-1.4 |
| with MgO + BaO + SrO | 1.1-2.3 |
| Na$_2$O | 0-<1 |
| K$_2$O | 0-<1 |
| with Na$_2$O + K$_2$O | 0-<1 |
| with (2.8 Li$_2$O + 1.2 ZnO)/5.2 MgO | >1.8 |
| TiO$_2$ | 1.8-3.5 |
| ZrO$_2$ | 0.8-1.6 |
| with $\frac{TiO_2}{ZrO_2}$ | >2.2 |
| F | 0.05-1, advantageously 0.05-0.3; | and at least one oxide of a multivalent element selected from the group consisting of SnO$_2$, V$_2$O$_5$, CeO$_2$, MnO$_2$ and Fe$_2$O$_3$, wherein each respective one of said at least one multivalent element oxide comprises at least 0.15% of the glass-ceramic, such that the sum of said multivalent element oxide(s) comprises 0.2-2% of the glass ceramic, and SnO$_2$, if included, comprises 0.15-0.7% of the glass-ceramic.

* * * * *